United States Patent [19]

Sakabe et al.

[11] Patent Number: 4,624,935
[45] Date of Patent: Nov. 25, 1986

[54] DIELECTRIC CERAMIC COMPOSITION

[75] Inventors: Yukio Sakabe, Kyoto; Goro Nishioka, Takatsuki; Junichi Imanari, Nagaokakyo, all of Japan

[73] Assignee: Murata Manufacturing Co., Ltd., Japan

[21] Appl. No.: 791,302

[22] Filed: Oct. 25, 1985

[30] Foreign Application Priority Data

Oct. 31, 1984 [JP] Japan .................. 59-230799

[51] Int. Cl.$^4$ ........................................ C04B 35/49
[52] U.S. Cl. ........................................ 501/134
[58] Field of Search ........................................ 501/134

[56] References Cited

U.S. PATENT DOCUMENTS

| 4,379,319 | 4/1983 | Wilson | 501/134 |
| 4,542,107 | 9/1985 | Kato et al. | 501/134 |

FOREIGN PATENT DOCUMENTS

| 56-104778 | 8/1981 | Japan | 501/134 |
| 57-168405 | 10/1982 | Japan | 501/134 |
| 59-196503 | 11/1984 | Japan | 501/134 |

Primary Examiner—Mark L. Bell
Attorney, Agent, or Firm—Ostrolenk, Faber, Gerb & Soffen

[57] ABSTRACT

A dielectric ceramic composition of a ternary component system, $Pb(Ni_{\frac{1}{3}}Nb_{\frac{2}{3}})O_3$-$PbTiO_3$-$Pb(Fe_{\frac{2}{3}}W_{\frac{1}{3}})O_3$. The three components, $Pb(Ni_{\frac{1}{3}}Nb_{\frac{2}{3}})O_3$, $PbTiO_3$ and $Pb(Fe_{\frac{2}{3}}W_{\frac{1}{3}})O_3$ have the compositional proportion expressed by the general formula:

$$xPb(Ni_{\frac{1}{3}}Nb_{\frac{2}{3}})O_3\text{-}yPbTiO_3\text{-}zPb(Fe_{\frac{2}{3}}W_{\frac{1}{3}})O_3$$

where x, y and z are proportions in mole % of the three components and $x+y+z=100$, the proportions of x, y and z falling in the area defined by a polygon ABCD encompassed by the points A, B, C and D shown in FIG. 1, the sets of proportions in mole % of the three components at the verticis, A,B,C and D of said polygon being as follows:

|   | x    | y    | z    |
|---|------|------|------|
| A | 87.0 | 12.5 | 0.50 |
| B | 75.0 | 15.0 | 10.0 |
| C | 42.5 | 37.5 | 20.0 |
| D | 62.0 | 37.5 | 0.50 |

5 Claims, 1 Drawing Figure

DIELECTRIC CERAMIC COMPOSITION

FIELD OF THE INVENTION

This invention relates to a dielectric ceramic composition and, more particularly, to an improved dielectric ceramic composition with a high dielectric constant or not less than 8000 and a low sintering temperature of 900° to 1000° C.

BACKGROUND OF THE INVENTION

In recent years, to manufacture compact, light electronic appliances for industrial and consumer uses with high quality and high operation frequencies, there is an increasing demand for monolithic ceramic capacitors since they have a large capacitance-to-volume ratio, high mass producibility and superior electrical properties including high frequency characteristics, heat resistance.

Such monolithic ceramic capacitors are generally composed of a dielectric ceramic composition consisting essentially of barium titanates modified with one or more of stannates, zirconates and other titanates. However, the production of the monolithic ceramic capacitors requires use of an expensive noble metal such as Au, Pt and Pd as a material for internal electrodes since the ceramic compositions of the prior arts have a high sintering temperature ranging from 1300° to 1400° C. The use of the noble metal sets a limit to lower the manufacturing cost of the monolithic ceramic capacitors because of a high cost of the noble metal.

To solve this problem, it has been proposed to incorporate a glass component comprising oxides of boron, bismuth and lead into the above modified barium titanate composition. This ceramic composition makes it possible to use a relatively inexpensive silver-paradium alloy as a material for internal electrodes of the monolithic ceramic capacitors since its sintering temperature is relatively low and ranges from 1100° to 1150° C. However, the incorporation of the glass component causes lowering of the dielectric constant, resulting in the increase in size for a given capacitance. Accordingly, it is not possible with such a ceramic composition to lower the manufacturing cost of the monolithic ceramic capacitors.

It is an object of the present invention to provide a dielectric ceramic composition with a low sintering temperature of not more than 1000° C. and a high dielectric constant of not less than 8000.

Another object of the present invention is to provide a dielectric ceramic composition with a high dielectric constant, low dielectric loss, and a low sintering temperature that can be used as a dielectric material for monolithic ceramic capacitors comprising internal electrodes of a relatively inexpensive silverparadium alloy.

SUMMARY OF THE INVENTION

According to the present invention, there is provided a dielectric ceramic composition consisting essentially of a ternary component system, $Pb(Ni_{\frac{1}{3}}Nb_{\frac{2}{3}})-PbTiO_3-Pb(Fe_{\frac{2}{3}}W_{\frac{1}{3}}O_3$, and being expressed by the general formula:

$$xPb(Ni_{\frac{1}{3}}Nb_{\frac{2}{3}})O_3 - yPbTiO_3 - zPb(Fe_{\frac{2}{3}}W_{\frac{1}{3}})O_3$$

where x, y and z are proportions in mole % of the three components and x+y+z=100, the proportions of x, y and z falling in the area defined by a polygon ABCD encompassed by the points A, B, C and D shown in FIG. 1, the sets of proportions in mole % of the three components at the vertices, A,B,C and D of said polygon being as follows:

|   | x    | y    | z    |
|---|------|------|------|
| A | 87.0 | 12.5 | 0.50 |
| B | 75.0 | 15.0 | 10.0 |
| C | 42.5 | 37.5 | 20.0 |
| D | 62.0 | 37.5 | 0.50 |

In a preferred embodiment, the dielectric ceramic composition of the present invention further contains, as an additive, manganese in an amount of not more than 0.5 mole % in terms of $MnO_2$ with respect to one mole of the three components.

The invention will be further apparent from the following description with reference to examples and the accompanying drawing.

Figure 1:
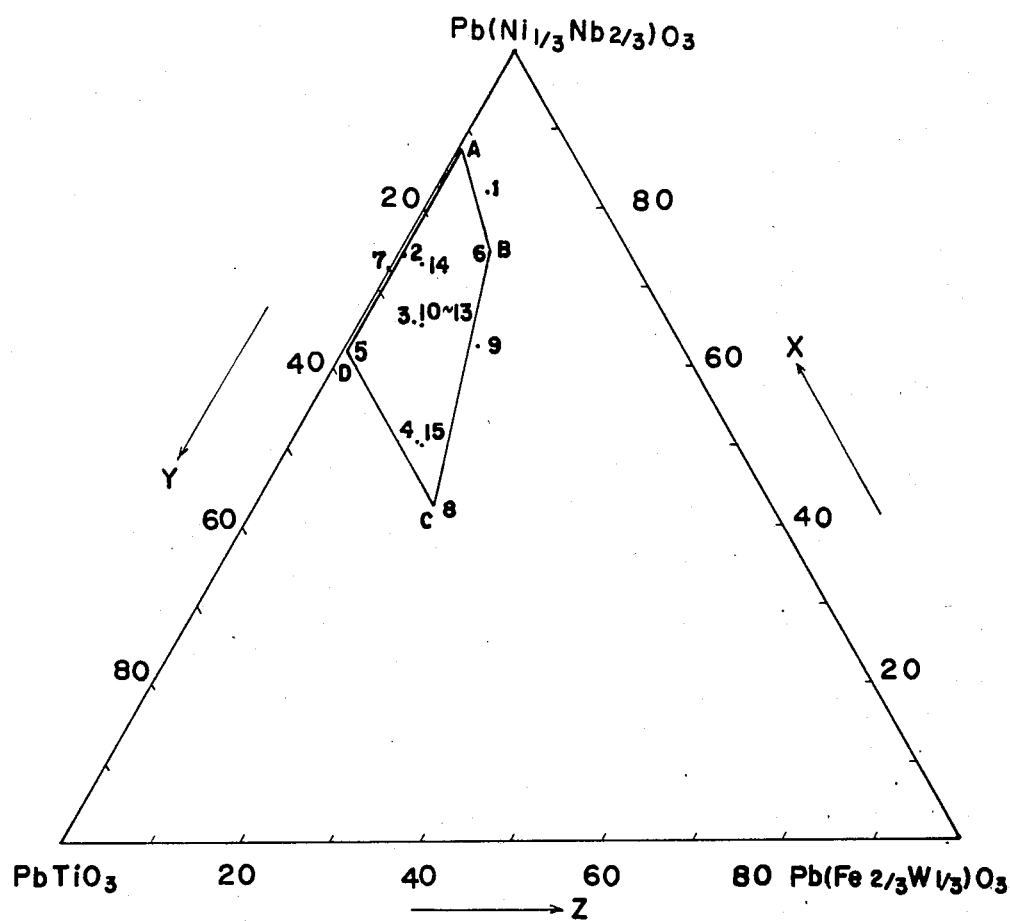
FIG. 1 is a ternary compositional diagram showing the compositional area of the dielectric ceramic composition according to the present invention.

In the FIGURE, the dielectric ceramic composition of the present invention falls in the polygonal area ABCD defined by the points A, B, C and D.

EXAMPLES

As starting raw materials there were used highly purified oxides (purity: 99.9%) PbO, $TiO_2$, $Fe_2O_3$, NiO, $Nb_2O_3$, $WO_3$ and $MnO_2$. These raw materials were weighed to prepare a mixture for the production of the final product having a composition with the compositional proportion shown in Table 1. Each of the resultant mixture (100 g) was wet milled in a polyethylene mill with agate balls for 10 hours. The resultant slurry was dehydrated, dried and then calcined in an alumina saggar for 2 hours at a temperature of 650° to 800° C. to prepare powder of the primary reactant (calcined powder). The calcined powder was pulverized and then wet milled together with 3% by weight of polyvinyl alcohol incorporated therein as a binder. The resultant slurry was dehydrated and then passed through a 50 mesh sieve screen. The thus obtained granulated powder was pressed into discs having a diameter of 12 mm and a thickness of 1.2 mm under a pressure of 2000 kg/cm$^2$ with an oil press. The discs were placed in a zirconia saggar and then fired with an electric furnace in a lead-containing atmosphere at 900° to 1000° C. for 2 hours.

Each of the resultant ceramic disc was provided on its both sides with silver electrodes by applying silver paste containing borosilicate glass frit and then baking the same at 750° C. for 10 minutes to prepare specimens for measurements of electrical properties.

The measurements were made on capacitance (C), dielectric loss (tan δ) and the insulation resistance (IR). The capacitance (C) and dielectric loss (tan δ) were measured at 1 KHz and 1 Vrms with an LCR meter, Model 4274 made by YOKOGAWA HEWLETT PACKARD CO. A thickness of the ceramic disc and a diameter of the opposed electrodes were measured to determine the dielectric constant (ε) and relative resistance (ρ). Insulation resistance was measured after applying a DC voltage of 500 V for 2 minutes with a megohm meter, Model TR 8601 made by TAKEDA RIKEN KOGYO CO. Temperature change rate of capacitance (ΔC/C) were determined from the capacitances measured at temperatures of −10° C., +25° C. and +85° C., respectively, by the following equation. ΔC/C=[($C_t$-$C_{25}$)/$C_{25}$]×100 (%) where $C_t$ is a capacitance measured at −10° C. or +85° C.

$C_{25}$ is a capacitance measured at +25° C. Results are shown in Table 1.

In Table 1, specimens with an asterisk (*) are those having a composition beyond the scope of the present invention, while other specimens are those included in the scope of the present invention. Specimen numbers are plotted in FIG. 1 for the better understanding of the scope of the present invention.

TABLE 1

| No. | composition (mole %) | | | | sintering temp. (°C.) | dielectric constant (ε) | tanδ (%) | Δc/c (%) | | relative resistance (logρ) | | |
|---|---|---|---|---|---|---|---|---|---|---|---|---|
| | x | y | z | $MnO_3$ | | | | +10° C. | +85° C. | 25° C. | 85° C. | 150° C. |
| 1* | 82 | 12 | 6.0 | 0.0 | 1100 | 4070 | 0.70 | +12.0 | −45.1 | 13.2 | 12.7 | 10.8 |
| 2 | 74 | 25 | 1.0 | 0.0 | 1000 | 10200 | 0.25 | +11.0 | −48.0 | 12.4 | 11.1 | 9.7 |
| 3 | 65 | 27.5 | 7.5 | 0.0 | 950 | 13500 | 0.14 | +14.5 | −50.4 | 11.7 | 10.5 | 9.2 |
| 4 | 50 | 35.0 | 15.0 | 0.0 | 900 | 11200 | 0.46 | −7.2 | −47.2 | 11.0 | 10.0 | 8.4 |
| 5 | 62 | 37.5 | 0.5 | 0.0 | 1000 | 8500 | 1.27 | −15.4 | −41.0 | 11.5 | 10.8 | 8.4 |
| 6 | 75 | 15.0 | 10.0 | 0.0 | 950 | 9700 | 0.36 | +14.2 | −47.0 | 12.1 | 11.4 | 10.1 |
| 7* | 72.5 | 27.5 | 0.0 | 0.0 | 1100 | 11500 | 0.51 | +5.0 | −54.0 | 12.7 | 11.8 | 10.5 |
| 8 | 42.5 | 37.5 | 20.0 | 0.0 | 1000 | 9200 | 1.6 | −25.1 | −31.5 | 11.9 | 10.5 | 9.7 |
| 9* | 62.5 | 22.5 | 15.0 | 0.0 | 900 | 6900 | 2.8 | +4.0 | −47.0 | 10.0 | 9.2 | 7.1 |
| 10 | 65 | 27.5 | 7.5 | 0.1 | 950 | 13200 | 0.20 | +14.0 | −50.1 | 12.4 | 11.8 | 9.9 |
| 11 | 65 | 27.5 | 7.5 | 0.3 | 950 | 13000 | 0.17 | +12.0 | −50.4 | 13.2 | 13.2 | 11.9 |
| 12 | 65 | 27.5 | 7.5 | 0.5 | 950 | 10700 | 0.14 | +11.5 | −50.4 | 13.0 | 12.4 | 10.8 |
| 13* | 65 | 27.5 | 7.5 | 0.8 | 950 | 7000 | 0.10 | +9.2 | −48.1 | 11.9 | 9.2 | 7.2 |
| 14 | 74 | 25 | 1.0 | 0.3 | 950 | 9800 | 0.12 | +5.4 | −47.0 | 13.5 | 13.1 | 12.6 |
| 15 | 50 | 35.0 | 15.0 | 0.3 | 900 | 10600 | 0.27 | −2.1 | −44.0 | 13.3 | 12.6 | 10.9 |

From the results shown in Table 1, it is apparent that the composition of the ternary component system Pb(Ni₄Nb₃)-PbTiO₃-Pb(Fe₃W₄)O₃ posseses a high dielectric constant of not less than 8000 even if it has a low sintering temperature ranging from 900° to 1000° C. Accordingly, the dielectric ceramic composition of the present invention makes it possible with a relatively inexpensive silver-paradium alloy to produce monolithic ceramic capacitors having a large capacitance-to-volume ratio because of its low sintering temperature ranging from 900° to 1000° C., high dielectric constant and low dielectric loss. Also, the composition of the present invention can be applied to manufacture of fixed ceramic capacitors as well as multi-layer ceramic capacitors.

The dielectric ceramic composition of the present invention has the superior electrical and physical characteristics. They include (1) high dielectric constant (ε) of not less than 8000
(2) low dielectric loss (tan δ) of not more than 2.5%.
(3) small temperature change rate of dielectric constant (ΔC/C) ranging from +25 to −56%.
(4) high insulation resistance at room temperature of not less than $10^{11}$ Ω-cm.
(5) low sintering temperature ranging from 900° to 1000° C.

The dielectric ceramic composition including a specific amount of Mn is improved in the insulation resistance at room and elevated temperatures.

The dielectric ceramic composition according to the present invention has been limited to those having the compositional proportion of the three components falling in the polygonal area ABCD in FIG. 1 for the following reasons.

If the composition has a compositional proportion of the three components, Pb(Ni₄Nb₃), PbTiO₃ and Pb(Fe₃W₄)O₃ falling in the area on the right of a side AB of the polygon in FIG. 1, its sintering temperature becomes high and exceeds 1000° C. and the dielectric constant becomes small and less than 8000.

If the composition has a compositional proportion of the three components falling in the area on the right of the side BC, its dielectric constant become small and less than 8000, and the dielectric loss (tan δ) exceeds 2.5%. In addition, the insulation resistance is much lowered at a temperature of more than 85° C.

If the composition has a compositional proportion falling in the area under the side CD of the polygon, the sintering temperature exceeds 1000° C., the dielectric constant becoming less than 8000 and the dielectric loss (tan δ) exceeding 2.5%.

If the composition has a compositional proportion of the three components falling in the area on the left of the side AD of the polygon, its sintering temperature becomes high and exceeds 1000° C.

The content of the additive, manganese, has been limited as being not more than 0.5% in terms of $MnO_2$ with respect to one mole of the main components, Pb(Ni₄Nb₃), PbTiO₃ and Pb(Fe₃W₄)O₃, for the following reasons.

If the content of $MnO_2$ exceeds 0.5 mole %, the dielectric constant becomes less than 8000 and the insulating resistance at high temperature is lowered.

What is claimed is:

1. A dielectric ceramic composition consisting essentially of a ternary component system expressed by the general formula:

xPb(Ni₄Nb₃)O₃-yPbTiO₃-zPb(Fe₃W₄)O₃ where x, y and z are proportions in mole % of the three components and x+y+z=100, the proportions of x, y and z falling in the area defined by a polygon ABCD encompassed by the points A, B, C and D shown in FIG. 1, the sets of proportions in mole % of the three components at the vertices, A,B,C and D of said polygon being as follows:

| | x | y | z |
|---|---|---|---|
| A | 87.0 | 12.5 | 0.50 |
| B | 75.0 | 15.0 | 10.0 |
| C | 42.5 | 37.5 | 20.0 |
| D | 62.0 | 37.5 | 0.50 |

2. A dielectric ceramic composition according to claim 1 further containing manganese in an amount of not more than 0.5 mole % in terms of $MnO_2$ with respect to one mole of a main component consisting essentially of $Pb(ni_{\frac{1}{3}}Nb_{\frac{2}{3}})$, $PbTiO_3$ and $Pb(Fe_{\frac{2}{3}}W_{\frac{1}{3}})O_3$.

3. A dielectric ceramic composition according to claim 2 in which the amount of manganese is 0.1–0.5 mole %.

4. A dielectric ceramic composition according to claim 3 in which x is 42.5–75, y is 15–37.5 and z is 0.5–20.

5. A dielectric ceramic composition according to claim 1 in which x is 42.5–75, y is 15–37.5 and z is 0.5–20.

* * * * *